United States Patent
Zaima

(10) Patent No.: US 9,659,242 B2
(45) Date of Patent: May 23, 2017

(54) APPARATUS THAT PERFORMS CALIBRATION FOR MAINTAINING IMAGE QUALITY

(71) Applicant: CANON KABUSHIKI KAISHA, Tokyo (JP)

(72) Inventor: Nobuhiko Zaima, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/200,316

(22) Filed: Mar. 7, 2014

(65) Prior Publication Data

US 2014/0185071 A1 Jul. 3, 2014

Related U.S. Application Data

(63) Continuation of application No. 12/793,802, filed on Jun. 4, 2010, now Pat. No. 8,705,137.

(30) Foreign Application Priority Data

Jun. 10, 2009 (JP) .................................. 2009-139606

(51) Int. Cl.
  G03G 15/00 (2006.01)
  G06K 15/02 (2006.01)
  G06F 3/12 (2006.01)
(52) U.S. Cl.
  CPC ....... G06K 15/027 (2013.01); G03G 15/5062 (2013.01)
(58) Field of Classification Search
  None
  See application file for complete search history.

(56) References Cited

U.S. PATENT DOCUMENTS 6,034,788 A 3/2000 Sasanuma et al.
6,418,281 B1 7/2002 Ohki
(Continued)

FOREIGN PATENT DOCUMENTS

JP 7-261479 A 10/1995
JP 8-287217 A 11/1996
(Continued)

OTHER PUBLICATIONS

Office Action—Chinese Patent Application No. 201010202810.7, State Intellectual Property Office of the People's Republic of China, Jul. 18, 2012.

(Continued)

*Primary Examiner* — Beniyam Menberu
(74) *Attorney, Agent, or Firm* — Fitzpatrick Cella Harper & Scinto

(57) ABSTRACT

To add an arbitrary recording medium as a recording medium that can be used for calibration to maintain the quality of an image to be formed, an image forming unit forms a pattern image on each of a specific recording medium that can be used for the calibration and the arbitrary recording medium. A creating unit creates second conversion setting information applied to the arbitrary recording medium to convert luminance information into density information, using first luminance information obtained from the pattern image formed on the specific recording medium, second luminance information obtained from the pattern image formed on the arbitrary recording medium, and first conversion setting information applied to the specific recording medium for converting luminance information into density information. A determining unit determines a common image formation condition applied to the specific recording medium and the arbitrary recording medium based on the second conversion setting information.

18 Claims, 13 Drawing Sheets

(56) References Cited

U.S. PATENT DOCUMENTS

| | | |
|---|---|---|
| 6,731,888 B2 | 5/2004 | Suzuki et al. |
| 7,203,434 B2 | 4/2007 | Nakayama |
| 7,345,798 B2 * | 3/2008 | Kondo ............................ 358/523 |
| 7,542,168 B2 | 6/2009 | Goma et al. |
| 7,843,601 B2 | 11/2010 | Yamada |
| 8,705,137 B2 * | 4/2014 | Zaima ........................... 358/3.26 |
| 8,804,217 B2 * | 8/2014 | Zaima ............................ 358/518 |
| 8,947,728 B2 * | 2/2015 | Zaima ............................ 358/1.9 |
| 8,977,143 B2 * | 3/2015 | Zaima .............................. 399/15 |
| 2002/0085235 A1 | 7/2002 | Degani et al. |
| 2005/0088710 A1 | 4/2005 | Nakayama |
| 2005/0219630 A1 | 10/2005 | Tsuchiya et al. |
| 2005/0225784 A1 | 10/2005 | Jacob et al. |
| 2005/0281573 A1 * | 12/2005 | Kitagawa et al. ............... 399/49 |
| 2007/0229923 A1 | 10/2007 | Itagaki et al. |
| 2008/0247769 A1 | 10/2008 | Zaima |
| 2009/0147289 A1 | 6/2009 | Fujita |
| 2009/0231376 A1 | 9/2009 | Moriya |
| 2009/0237740 A1 | 9/2009 | Kasahara |

FOREIGN PATENT DOCUMENTS

| | | |
|---|---|---|
| JP | 2000-350033 A | 12/2000 |
| JP | 2003-274204 A | 9/2003 |
| JP | 2004-138710 A | 5/2004 |
| JP | 2005-103850 A | 4/2005 |
| JP | 2005-125714 A | 5/2005 |
| JP | 2007-272112 A | 10/2007 |

OTHER PUBLICATIONS

Search Report issued in European Patent Application No. 10165406.9, dated Jul. 25, 2014.

\* cited by examiner

FIG. 13

| | FIRST CALIBRATION FIRST TEST PATTERN | SECOND CALIBRATION SECOND TEST PATTERN (1) | SECOND CALIBRATION SECOND TEST PATTERN (2) | ACCURACY | CONTROL TIME | NUMBER OF SHEETS OF X |
|---|---|---|---|---|---|---|
| i | X, Z | Z | Z | ○ | ○ | ◎ |
| ii | X | X, Z | Z | ○ | ○ | ○ |
| iii | X | X, Z | X | ○ | ○ | △ |
| iv | X | X | X, Z | ○ | ○ | △ |
| v | X | Z | X, Z | ○ | ○ | ○ |
| vi | X, Z | X, Z | X, Z | ◎ | △ | △ |
| vii | X | X, Z | X, Z | ◎ | △ | △ |

◎ GOOD  ○ PERMISSIBLE  △ BAD ically set forth in the claims.

APPARATUS THAT PERFORMS CALIBRATION FOR MAINTAINING IMAGE QUALITY

This application is a continuation application of U.S. patent application Ser. No. 12/793,802, filed Jun. 4, 2010, which is currently pending.

BACKGROUND OF THE INVENTION

Field of the Invention

The present invention relates to an image forming apparatus and an image processing apparatus that perform calibration to maintain image quality.

Description of the Related Art

Image quality in an image forming apparatus changes due to the environment where the image forming apparatus is used and the use status of the image forming apparatus. Further, image quality also changes due to the type of recording medium that is used. Therefore, it is necessary to change an image conversion condition and an image formation condition depending on the environment and the use status (Japanese Patent Laid-Open No. 07-261479). Similarly, it is necessary to add an image conversion condition and an image formation condition according to the type of recording medium that is used (Japanese Patent Laid-Open No. 08-287217).

Calibration to change an image conversion condition and an image formation condition depending on the environment and the use status needs to be performed at an appropriate timing, in order to maintain uniform image quality. In addition, it is assumed that the type of recording medium that was used in the last calibration, and the type of recording medium that is used in this calibration are the same. In Japanese Patent Laid-Open No. 07-261479, it is assumed that a specific recording medium is used every time calibration is performed. In the invention of Japanese Patent Laid-Open No. 08-287217, the same type of recording medium as the added medium needs to be prepared every time to perform calibration with regard to an arbitrary recording medium that has been added. It should be noted that if calibration is performed using a different type of recording medium, for example, the amount of applied toner may be insufficient, or the amount of applied toner determined by performing calibration may exceed the allowable range of the amount of applied toner determined when designing the image forming apparatus. This means that image quality cannot be maintained. If it is possible to perform calibration with regard to a desired recording medium using a different type of recording medium, an operator will find it convenient.

In view of this, a feature of the present invention is a solution for at least one of the above problems and other problems. For example, a feature of the present invention is enabling the performance of calibration for making the characteristics of an image forming apparatus and operation thereof appropriate, using an arbitrary recording medium. It should be noted that the other problems would be understood through the entire specification.

SUMMARY OF THE INVENTION

The present invention is applicable to an image forming apparatus and an image processing apparatus that perform calibration for maintaining the quality of an image that is formed, for example. The image forming apparatus is provided with an image forming unit, a creating unit, and a determining unit, for example. In order to add an arbitrary recording medium as a recording medium that can be used for calibration, the image forming unit forms a pattern image on each of a specific recording medium that can be used for the calibration and the arbitrary recording medium. The creating unit creates second conversion setting information that is applied to the arbitrary recording medium for converting luminance information into density information, using first luminance information obtained from the pattern image formed on the specific recording medium, second luminance information obtained from the pattern image formed on the arbitrary recording medium, and first conversion setting information that is applied to the specific recording medium for converting luminance information into density information. The determining unit determines a common image formation condition that is applied to the specific recording medium and the arbitrary recording medium based on the second conversion setting information.

Further features of the present invention will become apparent from the following description of exemplary embodiments with reference to the attached drawings.

BRIEF DESCRIPTION OF THE DRAWINGS

FIG. 13 is a diagram collectively showing combinations of test patterns and recording media used in a calibration operation including a recording medium addition operation, and the effects thereof.

DESCRIPTION OF THE EMBODIMENTS

Embodiments of the present invention are described below. The individual embodiments described below will be useful in understanding various concepts of the present invention such as superordinate concepts, intermediate concepts, and subordinate concepts. Moreover, it should be understood that the technical scope of the present invention is defined by the appended claims and not limited by the individual embodiments below.

Embodiment 1

Below is a description of an embodiment in which the present invention is applied to an electrophotographic color copier. Note that the present invention is applicable as long as the apparatus is an image forming apparatus that needs calibration. Specifically, the image forming system is not restricted to an electrophotographic system, and may be an ink jet system, an electrostatic recording system, or another system. Also, the present invention is applicable not only to an image forming apparatus that forms multicolor images, but also to an image forming apparatus that forms monochrome images. An image forming apparatus may be commercialized as a printing apparatus, a printer, a copier, a multi-function peripheral, or a facsimile, for example. Further, a recording medium may be referred to as a recording sheet, a recording material, paper, a sheet, a transfer material, or transfer paper. Furthermore, the material of the recording medium may be paper, fiber, film, resin, or the like.

Basic Hardware Configuration

Figure 1:
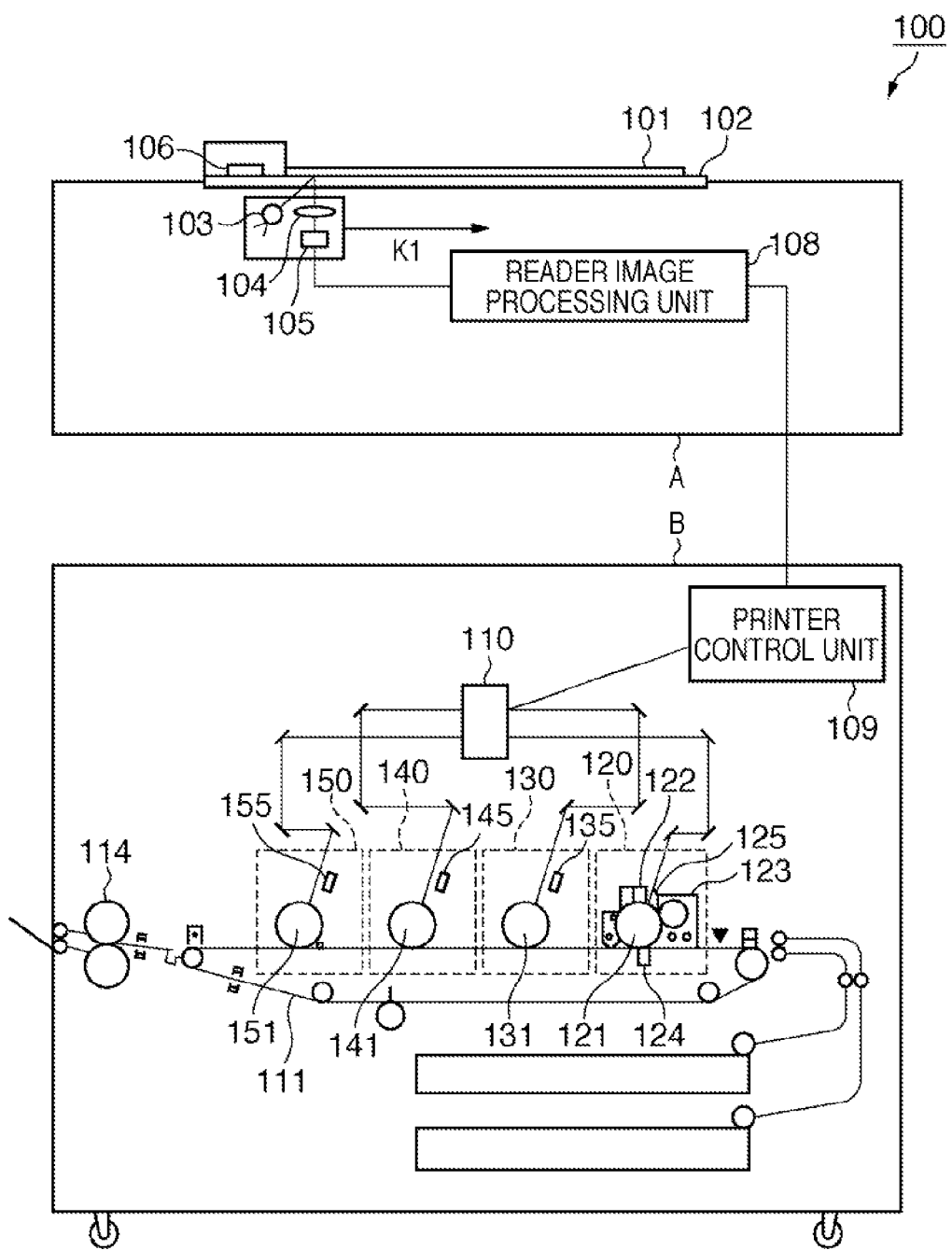
FIG. 1 is a diagram showing an example of a configuration of a color copier.

A copier 100 shown in FIG. 1 is constituted from a reader unit A that reads an image from an original document, and a printer unit B that forms the image obtained by the reader unit A on a recording medium. Before reading an original document 101 placed on an original document stage glass 102, the reader unit A performs so-called shading correction by reading a reference white board 106. The shading correction has two processes. The first process is a process of determining a correction value by reading the reference white board 106. The second process is a process of correcting an image signal using the correction value determined in advance. The original document 101 is irradiated with light by a light source 103, and an image is formed from the reflected light on a CCD sensor 105 via an optical system 104. A reading unit such as the CCD sensor 105 converts, line by line, the original document into electric signal data lines by moving in the direction of arrow K1. Note that the original document may move instead of the reading unit moving. The electric signal data lines are converted into image signals by a reader image processing unit 108.

Figure 2:
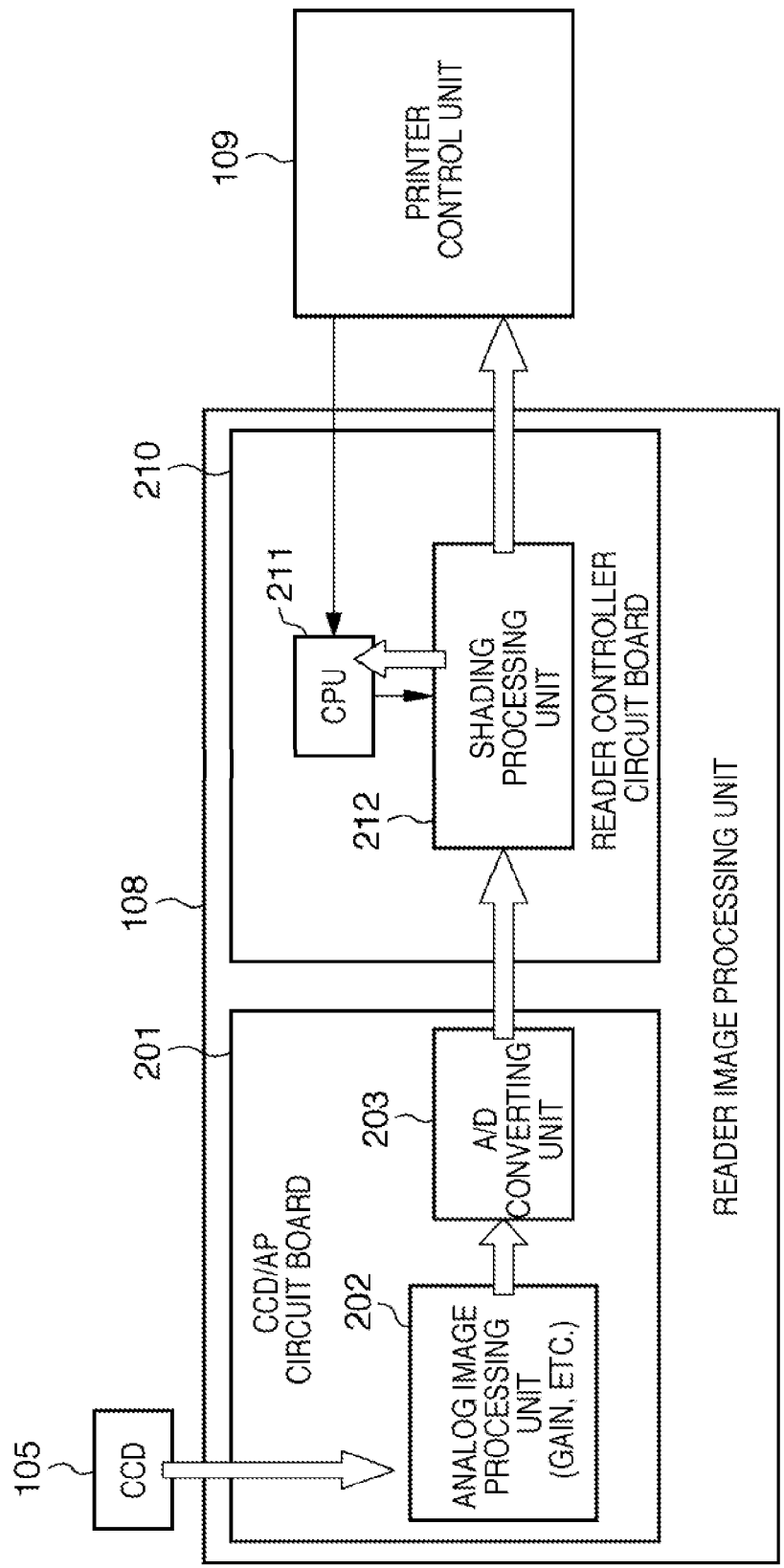
FIG. 2 is a block diagram showing a reader image processing unit.

A gain and the like of the image signal obtained by the CCD sensor 105 shown in FIG. 2 are adjusted by an analog image processing unit 202 of a CCD/AP circuit board 201, and the resultant image signal is converted into a digital image signal by an A/D converting unit 203, and the digital image signal is outputted to a reader controller circuit board 210. Shading correction is performed on the image signal by a shading processing unit 212 of the reader controller circuit board 210 under control of a CPU 211, and the resultant signal is outputted to a printer control unit 109 of the printer unit B. At this point in time, the image signal is configured by RGB luminance information pieces.

Next is a description of the printer unit B. According to FIG. 1, the printer control unit 109 converts an image signal into a laser beam on which PWM (pulse width modulation) has been performed. The laser beam is scanned and deflected by a polygon scanner 110, thus exposing photosensitive drums 121, 131, 141, and 151 of image forming units 120, 130, 140, and 150. Thereby, electrostatic latent images are formed. The image forming units 120, 130, 140, and 150 correspond to the color yellow (Y), the color magenta (M), the color cyan (C), and the color black (Bk). Since the configurations of the image forming units 120, 130, 140, and 150 are substantially the same, a description is given only on the image forming unit 120 that deals with yellow. A primary charger 122 charges the surface of the photosensitive drum 121 to a predetermined electric potential. A developer 123 forms a toner image by developing the electrostatic latent image on the photosensitive drum 121. A transfer blade 124 transfers the toner image on the photosensitive drum 121 to the recording medium on a transfer belt 111 by performing electric discharge from the back surface of the transfer belt 111. After that, the toner image is fixed on the recording medium by a fixer 114.

Note that the photosensitive drums 121, 131, 141, and 151 are provided with surface potential meters 125, 135, 145, and 155 for measuring the surface potential thereof. The surface potential meters 125, 135, 145, and 155 are used in order to adjust a contrast potential.

Figure 3:
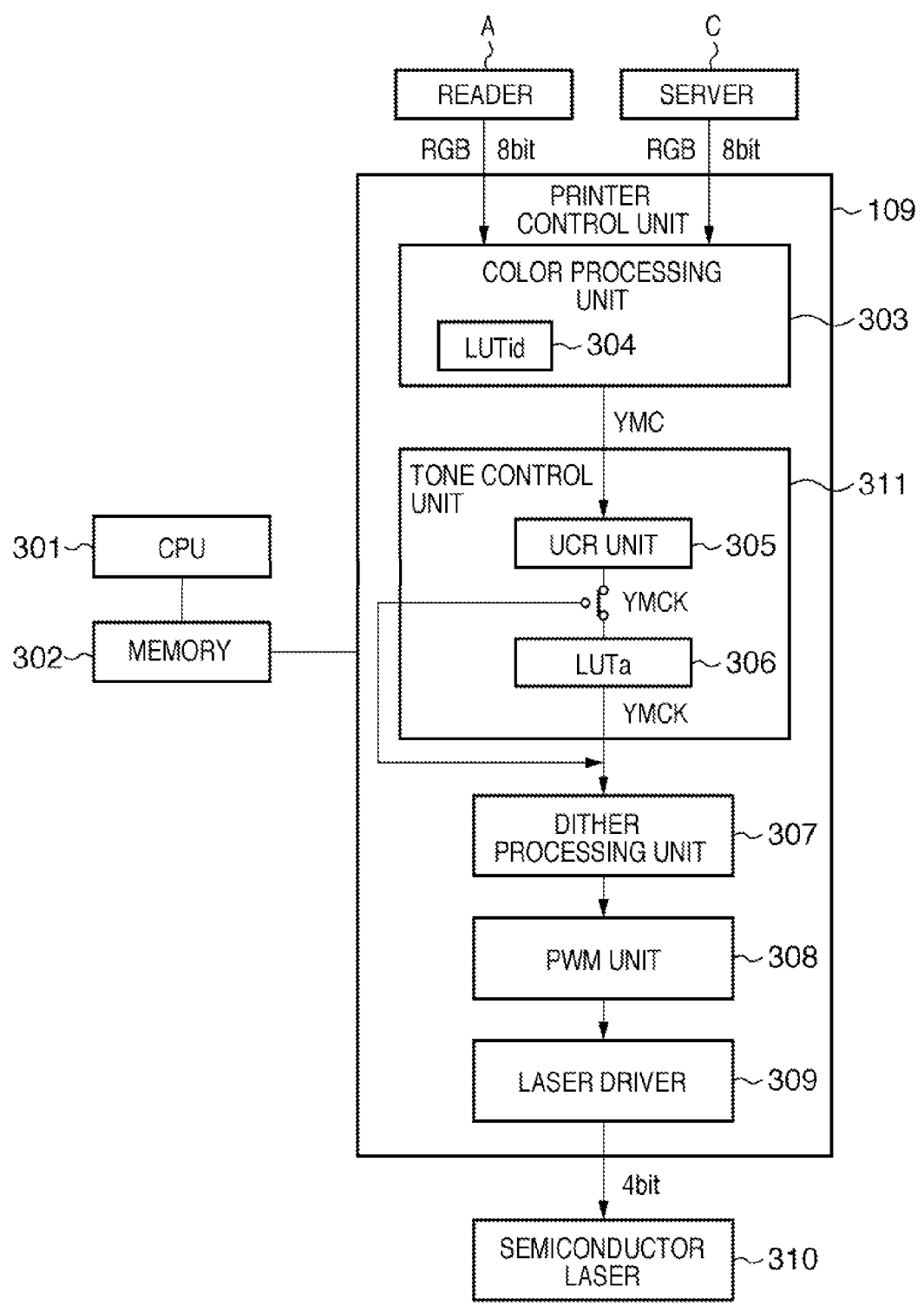
FIG. 3 is a block diagram showing a printer control unit 109.

A CPU 301 performs overall control of the units of the printer control unit 109 shown in FIG. 3. A memory 302 is a ROM or a RAM, and stores control programs and various data pieces. The image signals processed by the reader unit A or a print server C are inputted into a color processing unit 303 of the printer control unit 109. The color processing unit 303 applies image processing and color processing to the inputted image signal, so that desired output can be obtained if the output characteristics of the printer are ideal. Although the number of tones of the input signal is 8 bits, it is extended to 10 bits by the color processing unit 303 for improvement in accuracy. Note that the number of bits of the image signal is a mere example. A tone control unit 311 performs tone control on the image signal, and thereafter a dither processing unit 307 converts the image signal into a 4-bit signal by performing dither processing. A look-up table LUTid 304 used by the color processing unit 303 is a luminance-density conversion table for converting luminance information included in the image signal from the reader unit A into density information. Although the LUTid 304 is initially provided for a specific recording medium, in this embodiment, the LUTid 304 is added by performing an operation of adding an arbitrary recording medium.

The tone control unit 311 is provided with a UCR unit 305 and a look-up table LUTa 306, and corrects an image signal so as to cause the printer unit B to have ideal characteristics. The LUTa 306 is a 10-bit conversion table for correcting density characteristics, and is especially used in order to change γ characteristics of the printer unit B. The UCR unit 305 is a circuit that restricts a sum total of image signal levels by regulating the integrated value of image signals of pixels. If the sum total exceeds a prescribed value, the UCR unit 305 reduces the sum total of image signal levels by performing under color removal processing (UCR) for replacing CMY signals of a predetermined amount with K signals. Here, regulation of the sum total of image signal levels is for regulating the amount of applied toner in the image formation performed by the printer unit B. Making the operation of the printer unit B appropriate in this embodiment is to prevent image defects and the like that occur when the amount of applied toner exceeds the prescribed value.

The dither processing unit 307 performs dither processing on the signal outputted from the tone control unit 311, and a PWM unit 308 performs pulse width modulation on the resultant signal. A laser driver 309 causes a semiconductor laser 310 to emit light using the signal on which PWM modulation has been performed. Accordingly, the dither processing unit 307 performs half tone processing for converting a 10-bit image signal into 4-bit data.

Control of Image Formation Condition

A feature of the present invention is that printer characteristics are made appropriate by performing calibration using a user arbitrary recording medium. First, a description is given on calibration in the case of using a specific recording medium X set in advance. In the present embodiment, a first calibration function for controlling a contrast potential, and a second calibration function for controlling an image data γ correction circuit (the LUTa 306) are provided.

I. First Calibration

Figure 4:
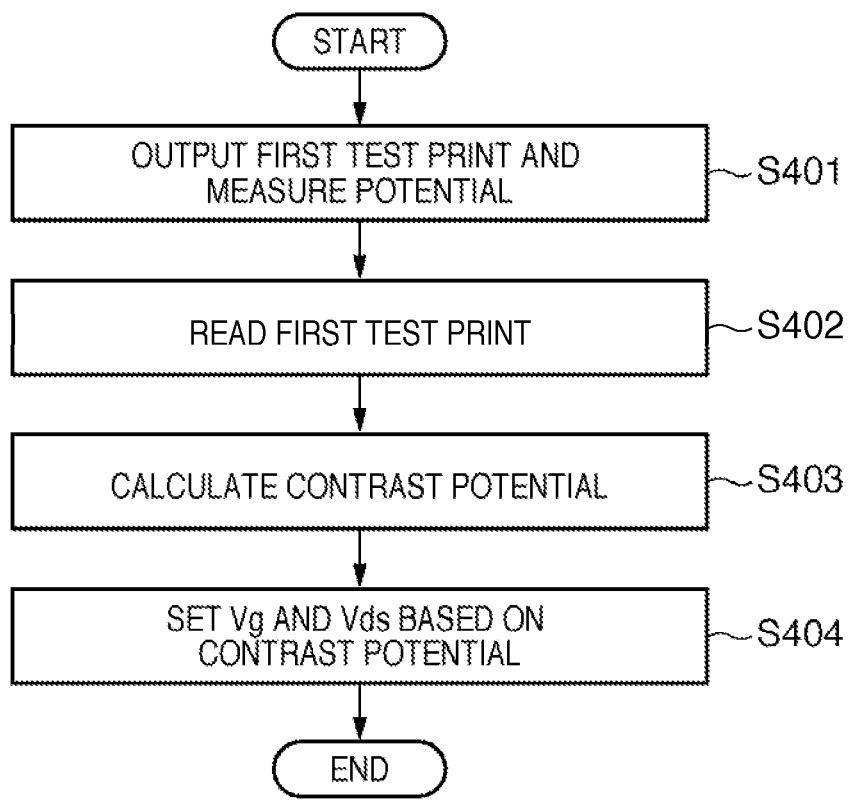
FIG. 4 is a flowchart showing processing for calculating a contrast potential in first calibration.

In FIG. 4, the CPU 301 functions as a first calibration unit that performs first calibration in order to determine a contrast potential using first luminance information obtained from an image formed on a specific recording medium. Examples of a specific recording medium include a recording medium that is designated in advance by the maker of the image forming apparatus.

In S401, the CPU 301 outputs a first test print, and measures the surface potential of photosensitive drums. For example, a first test pattern is formed on the specific recording medium X as an image by the CPU 301 creating the first test pattern, and outputting it to the color processing unit 303. This is the first test print. Note that as the contrast potential used when outputting the first test print, an initial value is set according to which it is predicted that a target density will be achieved in the atmosphere environment at that time (for example, absolute moisture amount). The memory 302 has stored therein values of contrast potentials that respectively correspond to various atmosphere environments. The CPU 301 determines a contrast potential by measuring the absolute moisture amount using a measuring circuit, and reading out the contrast potential corresponding to the measured absolute moisture amount from the memory 302. The first test pattern includes a belt pattern constituted from Y, M, C, and Bk half tone densities, and a patch pattern constituted from maximum density patches (for example, 255 level density signals) for Y, M, C, and Bk, for example. The surface potential meters 125, 135, 145, and 155 measure the actual contrast potentials at the time when the maximum density patches are formed, under control of the CPU 301.

In S402, the reader unit A reads the outputted first test print, and delivers RGB values to the CPU 301 of the printer control unit 109. The CPU 301 converts the RGB values into an optical density using a look-up table LUTid (X) that has been provided in advance with regard to the specific recording medium X. The LUTid (X) is a conversion table that has been set based on a relationship between the density information on the specific recording medium X and luminance values read by the reader unit A. A later-described LUTid (Z) for enabling an arbitrary recording medium Z to be used in calibration is created by changing or correcting this LUTid (X).

Figure 5:
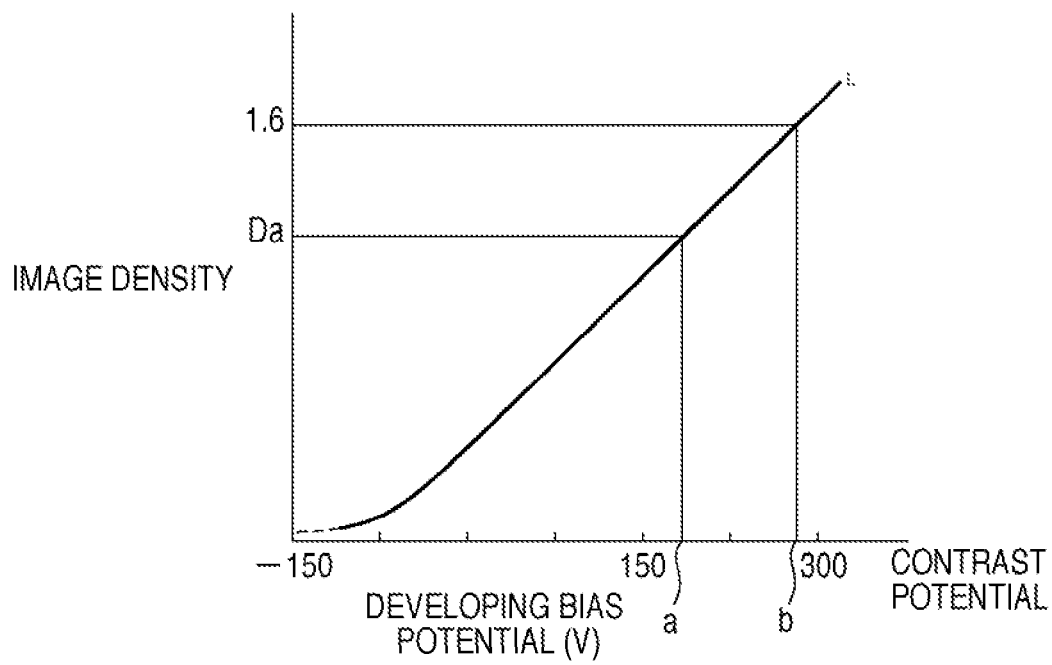
FIG. 5 is a diagram showing the relationship between the contrast potential and image density information.

In S403, the CPU 301 calculates a contrast potential b corresponding to a target maximum density. The horizontal axis in FIG. 5 represents developing bias potential, and the vertical axis represents image density. The contrast potential is a difference between the developing bias potential and the surface potential of a photosensitive drum when the semiconductor laser 310 of each color emits light at a maximum level after primary charging has been performed on the photosensitive drum. Suppose that the maximum density obtained from the first test print formed using a contrast potential a is Da. In this case, in the vicinity of the maximum density (density 0.8 to 2.0), image density is linear as shown by a solid line L, with respect to the contrast potential. The solid line L is determined based on the contrast potential a and the maximum density Da. In the present embodiment, the target maximum density is set to 1.6 as an example. The CPU 301 calculates the contrast potential b corresponding to the target maximum density based on the solid line L. It is assumed that a table or a function corresponding to the solid line L is stored in the memory 302 in advance. The contrast potential b is calculated using the following expression (1), for example.

$$b=(a+ka)\times 1.6/Da \qquad (1)$$

Here, ka is a correction coefficient, and is a value determined by the type of development system.

In S404, the CPU 301 determines and sets a grid potential Vg and a developing bias potential Vds based on the contrast potential b.

Figure 6:
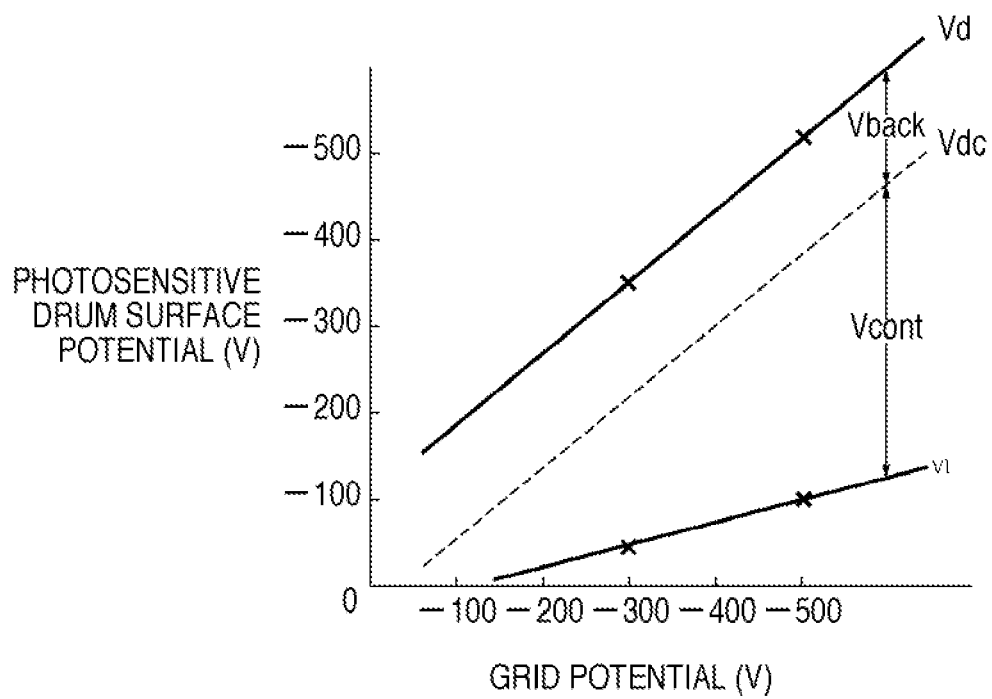
FIG. 6 is a diagram showing the relationship between a grid potential Vg and a photosensitive drum surface potential.

According to FIG. 6, the CPU 301 sets the grid potential Vg to −300 V, performs scanning with the semiconductor laser 310 of each color whose luminescence pulse level has been minimized, and measures a surface potential Vd with the surface potential meters 125, 135, 145, and 155. Furthermore, the CPU 301 sets the grid potential Vg to −300 V, measures a surface potential Vl with the surface potential meters 125, 135, 145, and 155 when the luminescence pulse level of the semiconductor laser 310 of each color has been maximized. Similarly, the CPU 301 measures the surface potentials Vd and Vl when the grid potential Vg is set to −500 V. The CPU 301 can obtain the relationship between the grid potential and the photosensitive drum surface potential shown in FIG. 6 by interpolating or extrapolating data from the case of −300 V and data from the case of −500 V. The control for obtaining such potential data is referred to as potential measurement control.

A contrast potential Vcont is determined as a difference voltage between a developing bias Vdc and the surface potential Vl. The maximum density can be set higher as the contrast potential Vcont is greater. The CPU 301 determines the grid potential Vg corresponding to the determined contrast potential b from the relationship shown in FIG. 6. The CPU 301 determines the corresponding surface potential Vd from the determined grid potential Vg and the relationship shown in FIG. 6. Furthermore, the CPU 301 determines the developing bias Vdc by subtracting Vback (for example, 150 V) from the surface potential Vd. Vback is a potential determined such that fogging toner will not adhere to an image.

II. Second Calibration

Figure 7:
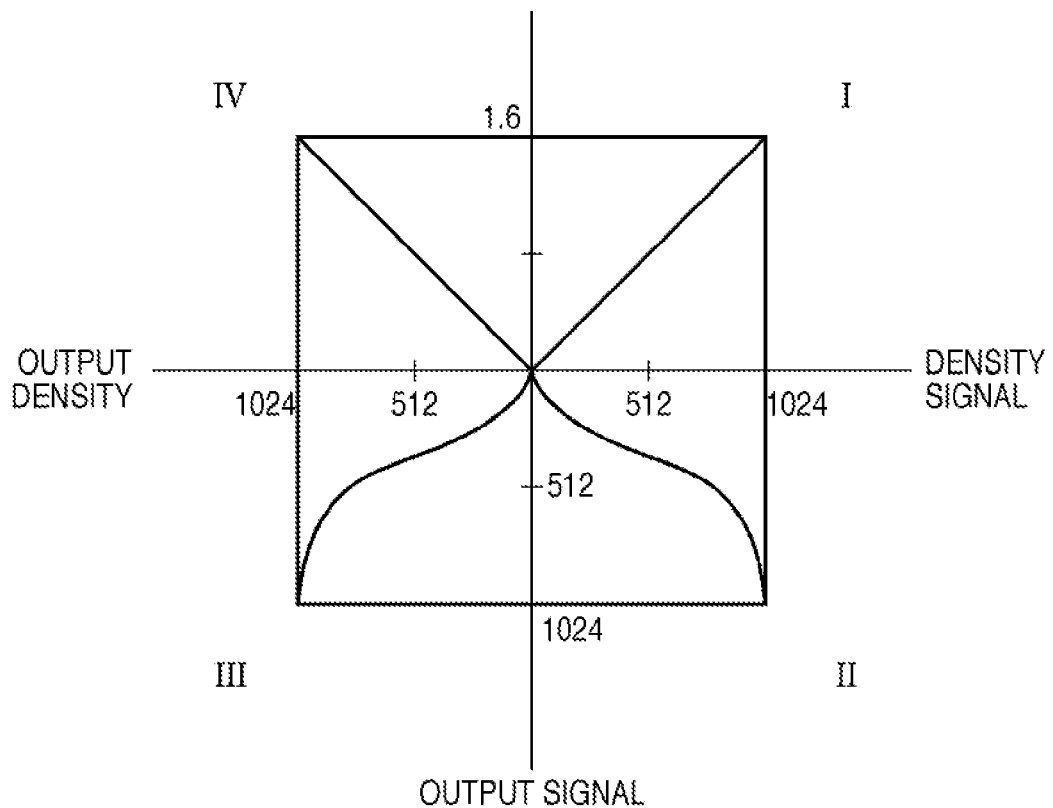
FIG. 7 is a characteristic conversion chart showing characteristics necessary in order to reproduce the density of an original document image.

In FIG. 7, Region I shows a reading characteristic of the reader unit A that converts an original document density into a density signal. Region II shows a conversion characteristic of the tone control unit 311 (the LUTa 306) for converting a density signal into a laser output signal. Here, a look-up table LUTa (X) corresponding to the specific recording medium X is set. Region III shows a recording characteristic of the printer unit B that converts from a laser output signal into an output density (recording density). Region IV shows the relationship between original document density and recording density, and this relationship indicates the overall tone reproduction characteristic of the copier 100 in the embodiment.

In the copier 100, in order to make the tone reproduction characteristic in Region IV linear, distortion of the recording characteristic of the printer unit B in Region III is corrected by the tone control unit 311 whose conversion characteristic is shown in Region II. The LUTa (X) can be easily created by merely switching input and output of the characteristic shown in Region III obtained in the case where a test print is outputted without causing the tone control unit 311 to operate. Note that in the present embodiment, although the number of output tones is 256 (8 bits), since the tone control unit 311 processes digital signals at 10 bits, the number of tones is 1024 in the tone control unit 311.

Figure 8:
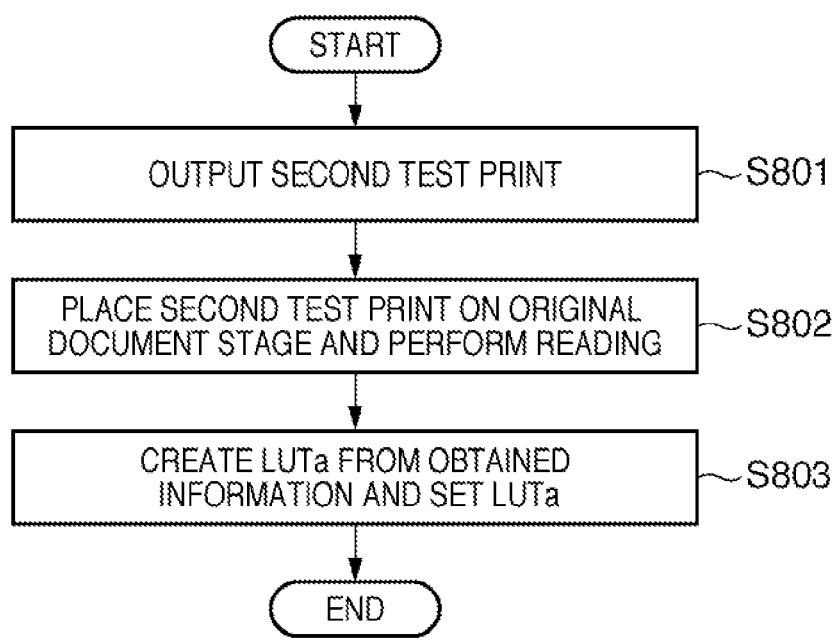
FIG. 8 is a flowchart showing second calibration.

In FIG. 8, the CPU 301 performs second calibration for determining an image formation condition involved with the tone reproduction characteristic. The second calibration is ordinarily performed when the first calibration ends.

In S801, the CPU 301 outputs a second test print. For example, the CPU 301 creates a second test pattern, and outputs it to the color processing unit 303, thereby forming the second test pattern on the specific recording medium X as an image. This serves as the second test print. At this time, the CPU 301 performs image formation without applying the LUTa of the tone control unit 311. Density signals YMCK outputted from the UCR unit 305 bypass the LUTa 306, and are inputted to the dither processing unit 307. Note that this can also be realized by setting a look-up table used as a unit matrix in the LUTa 306.

A second test pattern (patch group) constituted from a 4 column×16 row gradation (in other words, 64 tones) for each of the colors Y, M, C, and Bk, for example, is formed on the second test print. For example, the low density region of the total of 256 tones is mainly assigned to the 64-tone patches. Thereby, tone characteristics of a highlighted portion can be favorably adjusted. Note that the second test pattern may be provided for each of a low resolution (160 to 180 lpi), and a high resolution (250 to 300 lpi). "lpi" is an abbreviation of lines per inch. Formation of an image with a certain resolution can be realized by the dither processing unit 307 performing dither processing with a parameter for causing the image to have that resolution. Note that tone images may be created at a resolution of about 160 to 180 lpi, and linear images such as characters may be created at a resolution of 250 to 300 lpi. Although the same tone level test pattern is outputted at the two resolutions, if the tone characteristic greatly differs due to the difference between resolutions, it may set a tone level according to the resolution. Also, if the printer unit B is capable of forming images at three or more resolutions, the test print for the second calibration may be divided and outputted on a plurality of pages.

In S802, the reader unit A reads an image from the second test pattern. RGB luminance values outputted based on the second test pattern are inputted to the color processing unit 303. The color processing unit 303 converts the RGB luminance values into density values using the LUTid (X).

In S803, the CPU 301 creates a table showing the relationship between laser output level and density for each density value, by associating laser output levels used in order to create the second test pattern and creation positions of the test pattern (tone patch). The CPU 301 writes the created table in the memory 302. At this stage, the CPU 301 can obtain the characteristic of the printer unit B shown in Region III in FIG. 7, and determines a look-up table LUTa of this printer unit B by switching input and output of the characteristic, and sets the LUTa in the tone control unit 311. Data is insufficient to obtain a look-up table LUTa by calculation. That is because the tone patch is formed only for 64 tones, although 256 tones are actually necessary. In view of this, the CPU 301 creates necessary data by interpolating insufficient data. By performing such second calibration, it is possible to realize the tone reproduction characteristic that is linear with respect to a target density.

Although this embodiment describes a configuration in which the first calibration and the second calibration are performed sequentially, a configuration may be adopted in which only one of the calibrations is performed. In the present embodiment, it is possible to effectively correct, by performing calibration, change in image density, an image reproduction characteristic, or a tone reproduction characteristic that may occur in the short term or in the long term, and thus image quality is maintainable.

Operation of Adding Arbitrary Recording Medium

Next, the case of adding a recording medium that can be used for calibration is described. A feature of the present embodiment is that printer characteristics are made appropriate by performing calibration using an arbitrary recording medium.

If an arbitrary recording medium is used for calibration in which a specific recording medium is assumed to be used, a problem occurs in the printer output characteristics to be corrected. With regard to a specific recording medium, the amount of applied toner is known, and calibration is designed to be performed so that a defect does not appear in an image. Therefore, a tone characteristic can be matched with a desired characteristic by performing calibration using a specific recording medium. However, with regard to arbitrary recording media, the relationship between density and amount of applied toner is unknown. Therefore, in the calibration in which a specific recording medium is assumed to be used, if another recording medium is used, the amount of applied toner may exceed the value assumed at the time of designing. In this case, a problem may occur at the time of transfer or fixing, thus leading to the possibility of an image defect.

Figure 9:
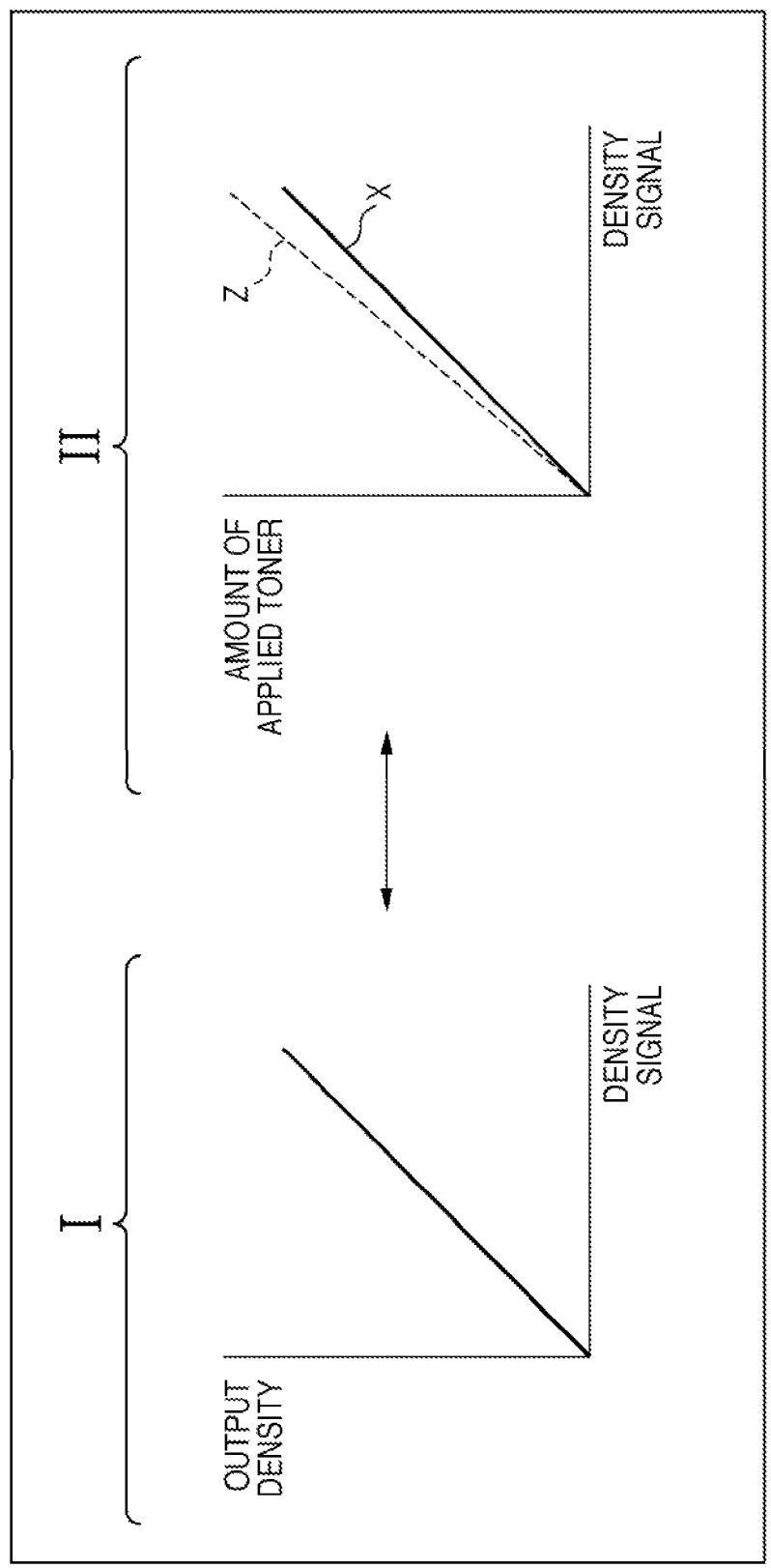
FIG. 9 is a diagram for illustrating the differences in characteristics between recording media.

FIG. 9 illustrates a recording medium Z of a different type for which the output density declines in the case of using the same amount of applied toner as that for the specific recording medium X. It is assumed that an image formation condition has been set with respect to both of the specific recording medium X and the different recording medium Z, such that an output density characteristic with regard to a certain primary color (a color expressed using only one color among a plurality of toner colors that are different from each other) becomes the output density characteristic shown in I of FIG. 9. In this case, the amounts of applied toner on the recording medium with respect to a density signal are as shown in II of FIG. 9. Specifically, the amount of applied toner on the other recording medium Z is greater than the amount of applied toner on the specific recording medium X. If a secondary color (a color expressed using two colors among a plurality of toner colors that are different from each other), a tertiary color (a color expressed using three colors among a plurality of toner colors that are different from each other), or the like is outputted in this state, the amount of toner on the recording medium Z will be greater than that assumed, thus resulting in the occurrence of a fixing defect.

In view of this, in the present embodiment, even if calibration is performed using the arbitrary recording medium Z, the same LUTa is created as in the case of performing calibration using the specific recording medium X. Then, the excess amount of applied toner is reduced by regulating the sum total of signal levels of image signals immediately before creation of the LUTa. In order to realize this, the same pattern image (image pattern) is formed using the same image signal on each of the specific recording medium X and the arbitrary recording medium Z. The reason for using the same image signal is to make the amount of applied toner equal on both of the specific recording medium X and the arbitrary recording medium Z. The reader unit A reads an image from each of the specific recording medium X and the arbitrary recording medium Z, and determines a luminance value for each medium. Furthermore, the CPU 301 calculates the luminance difference between these luminance values, and corrects the difference using a look-up table LUTid. For example, the CPU 301 creates the LUTid (Z) for the arbitrary recording medium Z by adding the difference to the LUTid (X) for the specific recording medium X. Therefore, when calibration is performed using the arbitrary recording medium Z, by setting the LUTid (Z) in the color processing unit, it is possible to create a look-up table LUTa that realizes toner characteristics equivalent to those as in the case of performing calibration using the specific recording medium.

Figure 10:
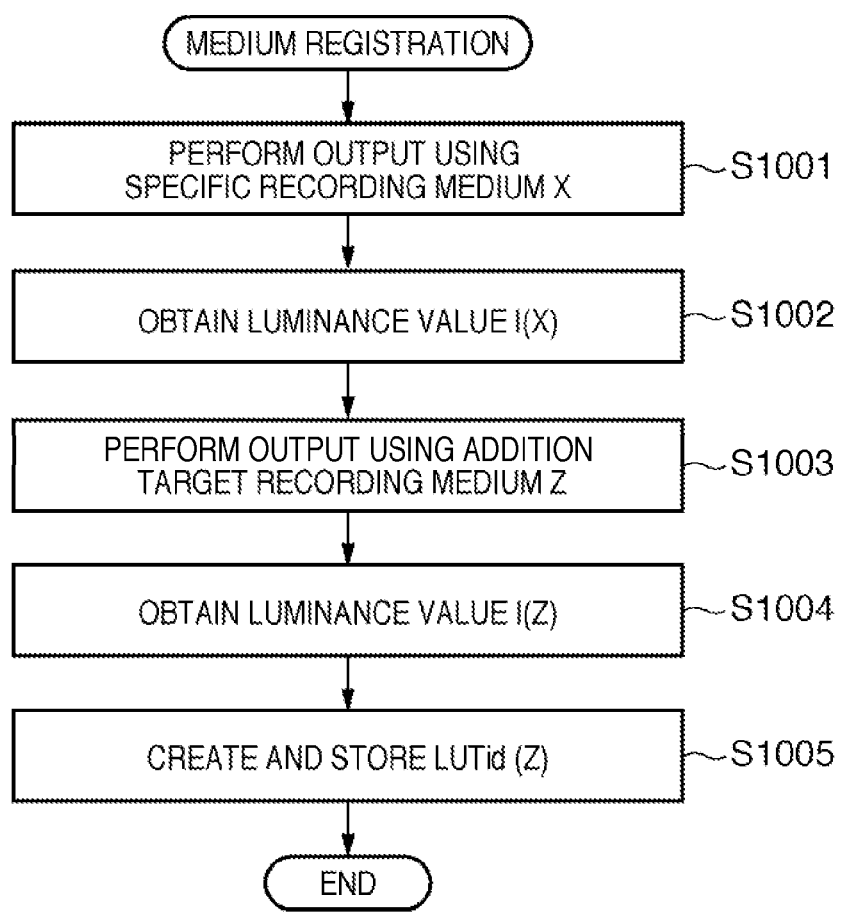
FIG. 10 is a flowchart showing an operation of adding a recording medium.

According to FIG. 10, when an instruction to additionally register a recording medium for calibration is given using a button of an operation unit with which the copier 100 is provided, the CPU 301 starts an addition operation. In S1001, the CPU 301 selects the specific recording medium X, and forms an image pattern on the specific recording medium X. As an image pattern, the second test pattern used for the second calibration can be employed, for example. The printer unit B corresponds to an image forming unit that forms an image using the same image signal on each of a specific recording medium that can be used for calibration, and an arbitrary recording medium, in order to add the arbitrary recording medium as a recording medium that can be used for calibration. In S1002, the reader unit A reads the image pattern formed on the specific recording medium X, generates a reading luminance value I(X), and delivers the generated value to the CPU 301 of the printer control unit 109. The luminance value I(X) corresponds to first luminance information obtained from the image formed on the specific recording medium.

In S1003, the CPU 301 selects the arbitrary recording medium Z, which is an addition target, and forms the second test pattern on the recording medium Z. In S1004, the reader unit A reads the image pattern formed on the recording medium Z, generates a reading luminance value I(Z), and delivers the generated value to the CPU 301 of the printer control unit 109. The luminance value I(Z) corresponds to second luminance information obtained from the image formed on the arbitrary recording medium. It is assumed that image data and image processing (setting of a look-up table, and the like) that are used in order to obtain the reading luminance value I(Z) are the same as those used in order to obtain the reading luminance value I(X).

In S1005, the CPU 301 creates the LUTid (Z) applied for when performing calibration with the recording medium Z, by applying the following method to the reading luminance values I(X) and I(Z), and stores the LUTid (Z) in the memory 302 or the color processing unit 303. The detailed method for creating the LUTid (Z) is as follows. Note that the LUTid (Z) corresponds to second conversion setting information for converting luminance information into density information with regard to a recording medium to be added arbitrarily.

Figure 11:
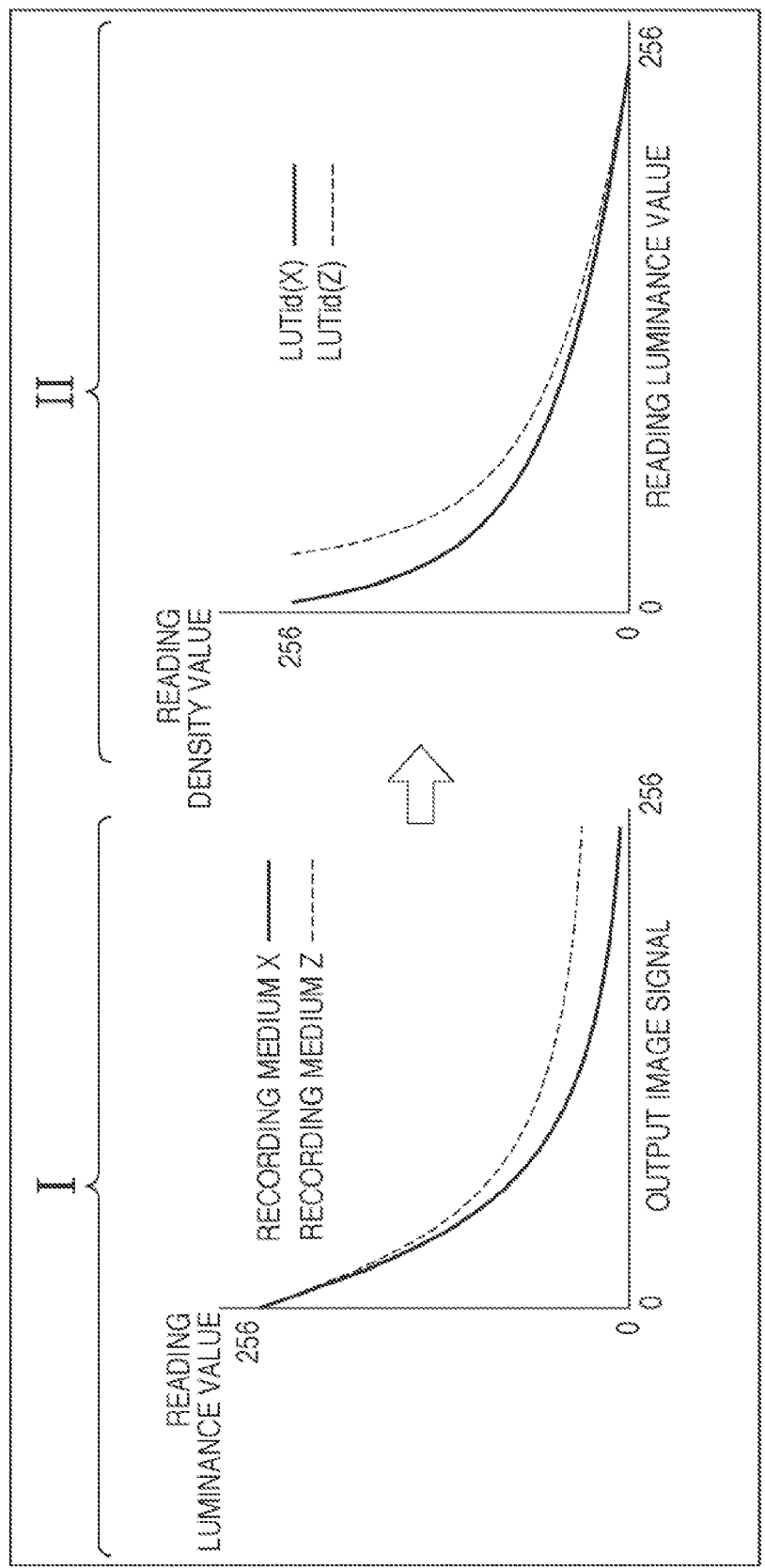
FIG. 11 is a diagram illustrating a method for creating a look-up table LUTid (Z) with regard to an arbitrary recording medium Z.

Next is a description with reference to FIG. 11. I of FIG. 11 shows the relationship between an output image signal and reading luminance values with respect to the specific recording medium X and the recording medium Z that is added arbitrarily. II of FIG. 11 shows the relationship between reading luminance values and reading density values. Note that density values of the recording medium Z have been converted into density values of the recording medium X.

The reading luminance value I(X) with respect to the specific recording medium X and the reading luminance value I(Z) with respect to the arbitrary recording medium Z are the luminance values read from the images formed on the recording media X and Z using the same image signal (that is, the same amount of applied toner). The CPU 301 calculates the luminance difference between the specific recording medium X and the arbitrary recording medium Z that is necessary in order to achieve the same amount of applied toner, based on the luminance values I(X) and I(Z). Therefore, the CPU 301 functions as a first calculating unit that calculates the difference between the first luminance information and the second luminance information.

The CPU 301 creates the LUTid (Z) with regard to the recording medium Z added arbitrarily, by adding the luminance difference to the LUTid (X). Therefore, the CPU 301 functions as a second calculating unit that calculates the second conversion setting information by adding the difference to the first conversion setting information. The LUTid (X) corresponds to the first conversion setting information for converting luminance information into density information with regard to a specific recording medium. Further, the CPU 301 functions as a creating unit that creates the second conversion setting information using the first luminance information, the second luminance information, and the first conversion setting information.

In this way, if the recording medium Z and the LUTid (Z) are used in combination, it is possible to obtain a calibration result similar to that in the case of using the recording medium X and the LUTid (X) in combination. This means that the LUTa that is determined using the recording medium Z and the LUTid (Z) in combination is substantially the same as the LUTa that is determined using the recording medium X and the LUTid (X) in combination. Specifically, even if the arbitrary recording medium Z is used instead of the specific recording medium X, the same LUTa can be theoretically obtained. The LUTa corresponds to the characteristic shown in Region II shown in FIG. 7. Therefore, if the printer characteristic shown in Region III is the same, the LUTa (X) created using the recording medium X and a look-up table LUTa (Z) created using the recording medium Z are the same. Therefore, the LUTa (Z) corresponds to the common image formation condition applied with respect to a specific recording medium and an arbitrary recording medium. The CPU 301 functions as a determining unit that determines an image formation condition based on the second conversion setting information. The CPU 301 associates the created LUTid (Z) with identification information of the added arbitrary recording medium Z, and stores the result in the memory 302.

Figure 12:
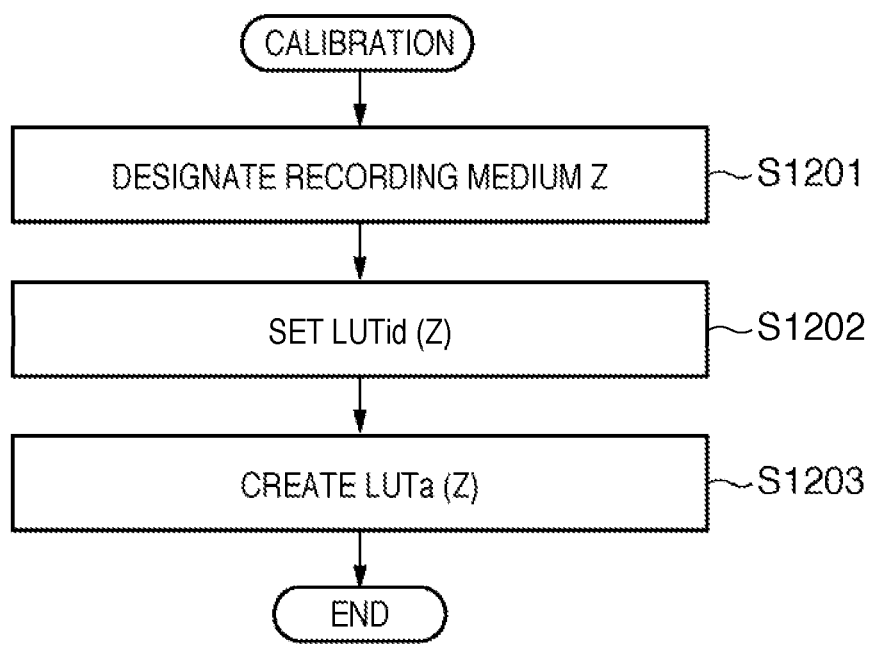
FIG. 12 is a flowchart showing calibration using an added recording medium.

Next, a description is given with reference to FIG. 12. In S1201, the CPU 301 allows an operator to designate which recording medium is to be used via the operation unit. In S1202, the CPU 301 sets the LUTid (X) in the color processing unit 303 if the recording medium X is designated, and sets the LUTid (Z) in the color processing unit 303 if the recording medium Z is designated. Therefore, the CPU 301 functions as a designating unit that designates a recording medium to be used for calibration. In S1203, the CPU 301 performs the first calibration (S401 to S404) and the second calibration (S801 to S803). In particular, the LUTa (Z) is created by performing the second calibration. Note that the color processing unit 303 performs conversion processing using a look-up table LUTid corresponding to the recording medium designated by the CPU 301. Therefore, the color processing unit 303 functions as a converting unit that, when a specific recording medium is designated by the designating unit, converts luminance information obtained from the image formed on the specific recording medium into density information based on the first conversion setting information. Further, the color processing unit 303 functions as a converting unit that, when a recording medium arbitrarily added is designated by the designating unit, converts luminance information obtained from the image formed on this recording medium added arbitrarily into density information based on the second conversion setting information.

According to the present embodiment, based on the characteristic of the specific recording medium X (the luminance value I(X)), the characteristic of the arbitrary recording medium Z (the luminance value I(Z)), and the first conversion setting information for the recording medium X (the LUTid (X)), the second conversion setting information for the recording medium Z (the LUTid (Z)) is created. Thereby, calibration can be performed using the arbitrary recording medium Z. In particular, by forming an image on the recording media X and Z using the same image signal, the amounts of applied toner on both the media can be made the same. Since the amounts of applied toner are the same, the difference between the luminance values I(X) and I(Z) corresponds to the difference between the LUTid (X) and the LUTid (Z). Therefore, the LUTid (Z) can be obtained comparatively easily by adding the difference between the luminance values I(X) and I(Z) to the LUTid (X).

Furthermore, since the common image formation condition (LUTa) applied with respect to a specific recording medium and a recording medium added arbitrarily is determined based on the second conversion setting information, it is not necessary to provide an image formation condition (LUTa) for each recording medium. Specifically, although it is necessary to provide a look-up table LUTid for converting luminance information into density information for each recording medium, it is not necessary to provide a look-up table LUTa for each recording medium. One of the advantageous effects is that a look-up table LUTa can be used in common among a plurality of types of recording media. That is, although it is necessary to switch the LUTid according to the type of designated recording medium, it is not necessary to switch the LUTa. Compared with other examples in which a dedicated LUTa is stored for each type of recording medium, in the present invention, it is also possible to reduce the storage capacity of a memory.

According to the present embodiment, since it is possible to accurately make the state of a single color output characteristic of the printer unit B a desired state, it is also possible to increase the accuracy of color reproducibility for when color management using an ICC profile is performed by the printer control unit 109, an external controller, or the like. Note that ICC is the abbreviation for the International Color Consortium.

In the present embodiment, a description has been given assuming that in the operation of adding a recording medium, image formation and reading is performed with respect to the recording medium X, and thereafter image formation and reading is performed with respect to the recording medium Z. However, image formation may be performed first with respect to the recording media X and Z, and thereafter images may be read from the recording media X and Z. Processing may be performed on the recording medium X first, or the recording medium Z first.

Embodiment 2

In the present embodiment of the invention, a recording medium addition operation and calibration are performed in parallel. Some of the reading luminance values used for calibration can be shared with the recording medium addition operation by including the recording medium addition operation in the calibration operation. Therefore, the number of output sheets can be reduced, and time and effort can be saved compared with the case where each operation is performed individually.

A description is given below with reference to FIG. 13. Here, it is assumed that one test pattern is used for the first calibration, and two test patterns are used for the second calibration. In order to enable the recording medium addition operation to be also performed in the first calibration, for each of the colors Y, M, C, and Bk, a 4 column×16 row patch (a patch that is a gradation including 64 tones in total) is also added to the first test pattern. Such pattern is shown in e.g. U.S. Pre-Granted Publication No. 2008-0247769.

Cases i and vi in FIG. 13 are examples in which the recording medium addition operation is performed in the first calibration. In particular, in the case i, since the recording medium Z is added in the first calibration, the second calibration is performed using the recording medium Z. Assuming that it is difficult for the operator to obtain the specific recording medium X, it is highly convenient to be able to perform calibration using only one sheet of the specific recording medium X. Cases ii, iii, v, and vii show examples in which the recording medium addition operation is performed in the first half of the second calibration. In a case iv, the recording medium addition operation is performed in the second half of the second calibration. As is clear from FIG. 13, the CPU 301 performs the first calibration at least using a specific recording medium, and performs the second calibration using only an arbitrary recording medium, or using an arbitrary recording medium and a specific recording medium.

Compared with the case i, in the cases ii to v, although the accuracy and control time are approximately the same, more sheets of the recording medium X are used. In the cases vi and vii, since more sheets of the recording media X and Z are used, the amount of data used for LUTid creation also increases, and thus accuracy in creation is expected to improve. However, the total number of sheets of recording media necessary and control time will increase as compared with the case i. Which combination is to be used may be determined appropriately in accordance with the characteristics of an image forming apparatus, for example. Here, the case i, which is considered to be the most efficient, is described.

Figure 14:
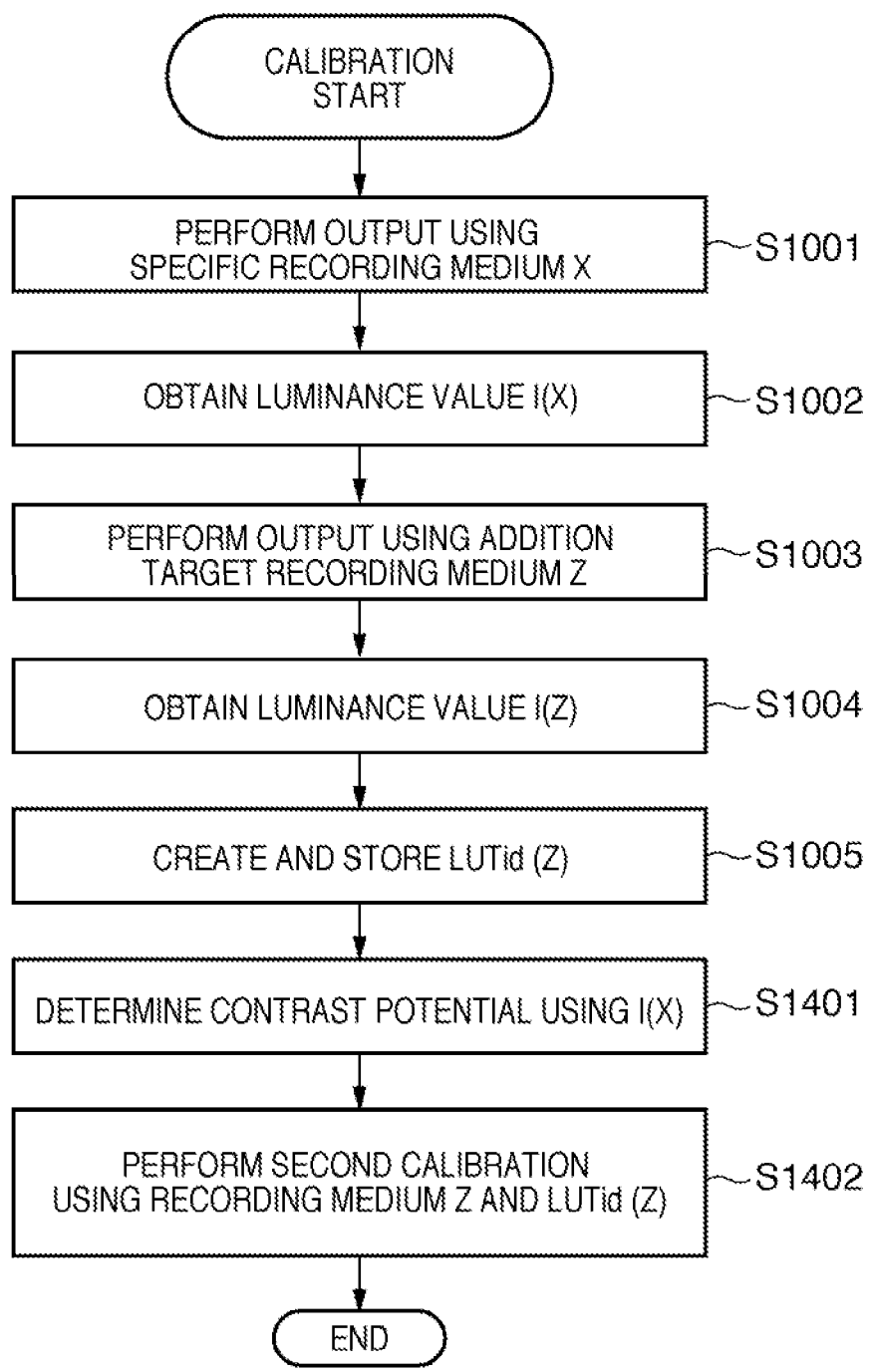
FIG. 14 is a flowchart showing calibration in a case i in Embodiment 2.

According to FIG. 14, it is assumed that the CPU 301 selects the case i from among the cases i to vii. Note that this description has been simplified by giving the same reference numerals to the steps common with those in FIG. 10. In S1001 to S1005 described above, processing for registering the arbitrary recording medium Z is performed. Specifically, the LUTid (Z) for the recording medium Z is created.

In S1401, the CPU 301 performs the first calibration. Specifically, the CPU 301 reads the luminance value I(X) of the recording medium X obtained in S1002 from the memory 302, and determines a contrast potential. Since the luminance value I(X) obtained by performing the operation of adding the arbitrary recording medium Z can be used as is in the first calibration, processing for obtaining the luminance value I(X) in the first calibration can be omitted. In this way, the CPU 301 performs the first calibration using the first luminance information I(X) obtained in order to create the second conversion setting information. As a result, the operation of adding an arbitrary recording medium and the first calibration can be performed in parallel.

In S1402, the CPU 301 selects the recording medium Z, creates a 1st second test pattern and a 2nd second test pattern, and creates a look-up table LUTa by applying the LUTid (Z) to these test patterns. Note that the details of the second calibration are the same as those described in Embodiment 1.

According to Embodiment 2, in addition to the effects of Embodiment 1, since calibration and the operation of adding an arbitrary recording medium are performed as one series of operations, the total number of sheets of recording media used can be reduced. Further, in Embodiment 2, since the luminance value I(X) of the specific recording medium X obtained by performing the addition operation is also shared in the first calibration, the time for obtaining the luminance value I(X) can also be reduced.

Embodiment 3

In Embodiment 3 of the present invention, a description is given in which if the recording medium for calibration runs out in the middle of calibration, calibration can be continued by additionally registering a recording medium for calibration.

In Embodiment 3, N test prints in total (test patterns) are necessary. For example, if three test patterns for the second calibration are necessary to deal with six resolutions, and one test pattern used in the first calibration is necessary, four sheets of a recording medium in total are necessary. As the number of test patterns increases, the possibility that the recording medium will run out in the middle of calibration increases. Note that other reasons for the number of test patterns increasing include the case where accuracy is improved by increasing the number of tones and the patch size, and the case where the number of patches on one sheet is decreased due to the circumstances of an image reading apparatus, for instance. Particularly, if color sensors that are mounted in-line in a paper discharging unit and automatically detect patches are used as an image reading apparatus rather than an original document reading apparatus of the copier, there are often cases where many test patterns are necessary.

In Embodiment 3, it is assumed that m is the remaining number of sheets of the registered recording medium designated to be used in advance (the recording medium X, for instance). The value of m may be inputted by the operator to the CPU 301 via the operation unit in advance, or may be obtained by a remaining sheet number detector provided in a recording medium storage case.

Figure 15:
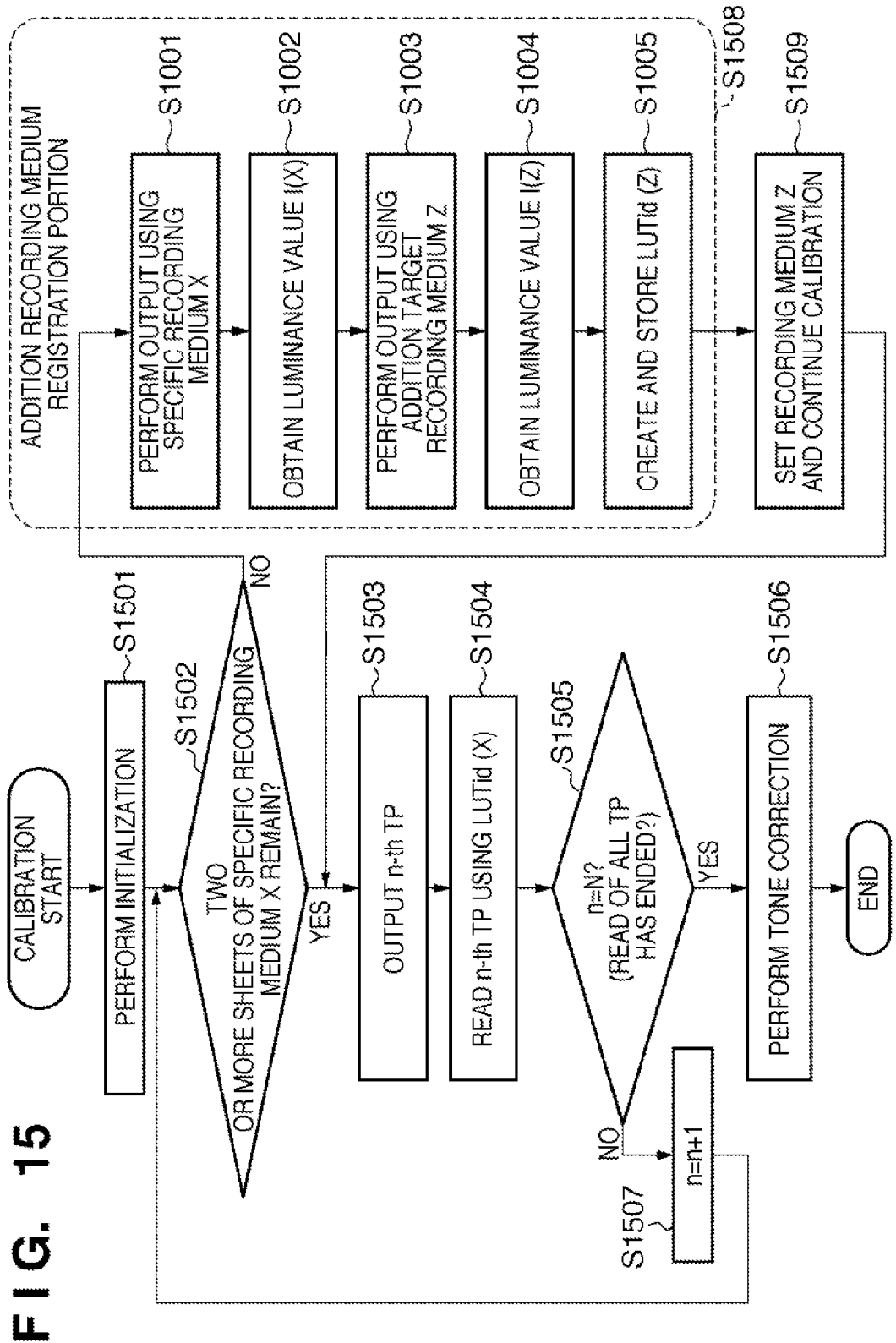
FIG. 15 is a flowchart showing calibration in Embodiment 3.

Next, a description is given with reference to FIG. 15. In S1501, the CPU 301 performs initialization processing. For example, the CPU 301 substitutes 1 for a variable n for counting the current number of test prints, substitutes the remaining number of recording sheets for the variable m, and substitutes the total number of sheets necessary for calibration for N.

In S1502, the CPU 301 compares the remaining number m of sheets of the recording medium (for example, the specific recording medium X) designated to be used in advance and a threshold value th (for example, two sheets), and determines whether or not m is greater than or equal to th. In this way, the CPU 301 functions as a comparing unit that compares the total number of sheets of the recording medium necessary for the first calibration and the second calibration, and the remaining number of sheets of the specific recording medium.

Note that if the remaining number of sheets is less than two, in other words, one, the processing proceeds to S1508. In the recording medium addition operation in S1508, since at least one sheet of the registered recording medium is necessary, the threshold value th is set to two. Note that although the registered recording medium is basically the specific recording medium X, as long as the recording medium has been registered, the registered recording medium may be the recording medium Z. In the latter case, a different arbitrary recording medium W is registered using the recording medium Z. If m is greater than or equal to th, the processing proceeds to S1503. Here, for the sake of convenience in the description, it is assumed that the registered recording medium is basically the specific recording medium X.

In S1503, the CPU 301 outputs a test print by forming a test pattern on the specific recording medium X. It is assumed that the CPU 301 reads out the LUTid (X) for the specific recording medium X from the memory 302, and sets the LUTid (X) in the color processing unit. If the registered recording medium is Z, the LUTid (Z) is set in the color processing unit.

In S1504, the CPU 301 reads the test print using the reader unit A, and performs calibration. In S1505, the CPU 301 determines whether or not reading of all the test prints has ended. For example, the CPU 301 compares the current number of sheets n with the total number of sheets N. If reading of all the test prints has ended, the processing proceeds to S1506. In S1506, using the luminance value obtained from the test print, the CPU 301 performs setting of a contrast potential, and tone correction. If reading of all the test prints has not ended, the processing proceeds to S1507. In S1507, the CPU 301 adds one to the value of n. After that, the processing proceeds to S1502.

In S1502, if m is not greater than or equal to th, the processing proceeds to S1508. In S1508, the CPU 301 performs the operation of adding a recording medium (from S1001 to S1005). Here, it is assumed that the recording medium Z is added. In S1509, the CPU 301 sets the LUTid (Z) for the added recording medium Z in the color processing unit, and continues calibration. In other words, the processing returns to S1503.

According to Embodiment 3, in addition to the effects of Embodiments 1 and 2, if the total number of sheets of the specific recording medium exceeds the remaining number of sheets thereof, the effect is achieved of enabling compensation of the number of sheets corresponding to the difference between the remaining number of sheets of the specific recording medium and the total number of sheets thereof with an arbitrary recording medium. Specifically, if the recording medium runs out in the middle of calibration, the CPU 301 functions as a control unit that causes the image forming unit, the creating unit, and the determining unit to function and perform the operation of adding an arbitrary recording medium. Therefore, calibration can be continued.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-139606, filed Jun. 10, 2009 which is hereby incorporated by reference herein in its entirety.

What is claimed is:

1. An image forming apparatus, comprising:
a printer configured to form an image on a recording medium based on image data;
a memory configured to store a first converting condition corresponding to a specific recording medium; and
a controller having a processor configured to perform tasks including:
a correcting task that corrects image data based on a correcting condition for forming an output image by the printer;
an obtaining task that obtains read data by a reading unit reading a measurement image formed on the recording medium by the printer;

a converting task that converts the read data into density data using a converting condition corresponding to the recording medium;

a first generating task that generates the correcting condition based on the density data;

a printing task that, in a registering operation for registering another recording medium to be used for generating the correcting condition, controls the printer to form a first patch image on the specific recording medium and a second patch image on the other recording medium; and a second generating task that generates a second converting condition corresponding to the other recording medium using first read data obtained by the reading unit reading the first patch image formed on the specific recording medium, second read data obtained by the reading unit reading the second patch image formed on the other recording medium, and the first converting condition stored in the memory.

2. The image forming apparatus according to claim 1, wherein the memory stores the second converting condition generated in the second generating task such that the second converting condition is associated with the other recording medium.

3. The image forming apparatus according to claim 1, wherein the controller having the processor is further configured to perform:

an acquiring task that acquires information indicating a type of a recording medium; and a selecting task that selects a converting condition corresponding to the type of the recording medium based on the information acquired in the acquiring task, and wherein the converting task converts the read data using the selected converting condition.

4. The image forming apparatus according to claim 1, wherein the second generating task generates the second converting condition based on a difference between the second read data and the first read data, and the first converting condition.

5. The image forming apparatus according to claim 1, wherein the printer forms an image using toner, and the density data corresponds to the amount of toner usage for the measurement image.

6. The image forming apparatus according to claim 1, wherein the printer comprises:

a first image formation unit having a first photosensitive drum on which an image of a first color is formed, and a second image formation unit having a second photosensitive drum on which an image of a second color is formed, wherein the correction condition includes a first correction condition corresponding to the first image formation unit and a second correction condition corresponding to the second image formation unit.

7. The image forming apparatus according to claim 1, wherein the printing task controls the printer to form the first patch image corresponding to predetermined image data on the specific recording medium and the second patch image corresponding to the predetermined image data on the other recording medium.

8. The image forming apparatus according to claim 1, wherein the printing task controls the printer to form the second patch image on the other recording medium after the first read data is obtained.

9. The image forming apparatus according to claim 1, wherein the first read data corresponds to a luminance value of the first patch image and the second read data corresponds to a luminance value of the second patch image.

10. An image forming apparatus, comprising:

a printer configured to form an image on a recording medium based on image data;

a memory configured to store a first converting condition corresponding to a specific recording medium; and a controller having a processor configured to perform tasks including:

a correcting task that corrects image data based on a correcting condition for forming an output image by the printer;

an obtaining task that obtains read data related to a measurement image formed on the recording medium by the printer, wherein the read data is output from a reading device;

a converting task that converts the read data based on a converting condition corresponding to the recording medium;

a first generating task that generates the correcting condition based on the converted read data;

a printing task that, in a registering operation for registering another recording medium to be used for generating the correcting condition, controls the printer to form a first patch image on the specific recording medium and a second patch image on the other recording medium; and a second generating task that generates a second converting condition corresponding to the other recording medium based on first read data related to the first patch image, second read data related to the second patch image, and the first converting condition stored in the memory, wherein the reading device outputs the first read data, in a case where the reading device reads the first patch image formed on the specific recording medium, and the reading device outputs the second read data, in a case where the reading device reads the second patch image formed on the other recording medium.

11. The image forming apparatus according to claim 10, wherein the memory stores the second converting condition generated in the second generating task such that the second converting condition is associated with the other recording medium.

12. The image forming apparatus according to claim 10, wherein the controller having the processor is further configured to perform:

an acquiring task that acquires information indicating a type of a recording medium; and a selecting task that selects a converting condition corresponding to the type of the recording medium based on the information acquired by the acquiring unit, wherein the converting task converts the read data using the selected converting condition.

13. The image forming apparatus according to claim 10, wherein the second generating task generates the second converting condition based on a difference between the second read data and the first read data, and the first converting condition.

14. The image forming apparatus according to claim 10, wherein the printer forms an image using toner, and the converted read data corresponds to density data of the measurement image.

15. The image forming apparatus according to claim 10, wherein the printer comprises:

a first image formation unit having a first photosensitive drum on which an image of a first color is formed; and a second image formation unit having a second photosensitive drum on which an image of a second color is formed, wherein the correction condition includes a first correction condition corresponding to the first image formation unit and a second correction condition corresponding to the second image formation unit.

16. The image forming apparatus according to claim 10, wherein the printing task controls the printer to form the first patch image corresponding to predetermined image data on the specific recording medium and the second patch image corresponding to the predetermined image data on the other recording medium.

17. The image forming apparatus according to claim 10, wherein the printing task controls the printer to form the second patch image on the other recording medium after the first read data is obtained.

18. The image forming apparatus according to claim 10, wherein the first read data corresponds to a luminance value of the first patch image, and the second read data corresponds to a luminance value of the second patch image.

* * * * *